United States Patent [19]
Lesiecki

[11] 3,724,861
[45] Apr. 3, 1973

[54] NEW TRAPPED BUSHING SEAL

[75] Inventor: Gerald Lesiecki, Greendale, Wis. 53129

[73] Assignee: Allis-Chalmers Manufacturing Company, Milwaukee, Wis.

[22] Filed: Oct. 27, 1970

[21] Appl. No.: 84,296

[52] U.S. Cl. .................. 277/25, 277/32, 277/68, 277/70, 277/135
[51] Int. Cl. .......................................... F16j 15/16
[58] Field of Search ........ 277/3, 9, 13, 15, 17, 25, 27, 277/28, 32, 67, 68, 70, 135, 14, 53

[56] References Cited

UNITED STATES PATENTS

| | | | |
|---|---|---|---|
| 2,573,425 | 10/1951 | Fletcher, Jr. | 277/13 |
| 3,062,554 | 11/1962 | McGahan et al. | 277/25 X |
| 3,122,374 | 2/1964 | McGahan | 277/27 |
| 3,127,181 | 3/1964 | Crego et al. | 277/3 |
| 1,558,630 | 10/1925 | Reed | 277/28 X |

*Primary Examiner*—Houston S. Bell, Jr.
*Attorney*—John P. Hines, Robert B. Benson and Charles L. Schwab

[57] ABSTRACT

A rotary shaft seal is provided with a sealing fluid to seal a process fluid. The sealing fluid is admitted at a pressure just slightly higher than the pressure of the process fluid to provide a seal when the shaft is stationary and means are provided in the seal to increase this pressure as a function of rotation, with centrifugal force, to a sufficiently higher pressure than that of the process fluid pressure to prevent entrainment of the process fluid within the sealing fluid. A stable sealing fluid pressure decreasing means is provided in the seal which is also a function of rotation and which decreases the sealing fluid pressure with centrifugal force from the pressure in the high pressure area to the pressure of the process fluid at the process fluid-sealing fluid interface.

4 Claims, 1 Drawing Figure

PATENTED APR 3 1973 3,724,861
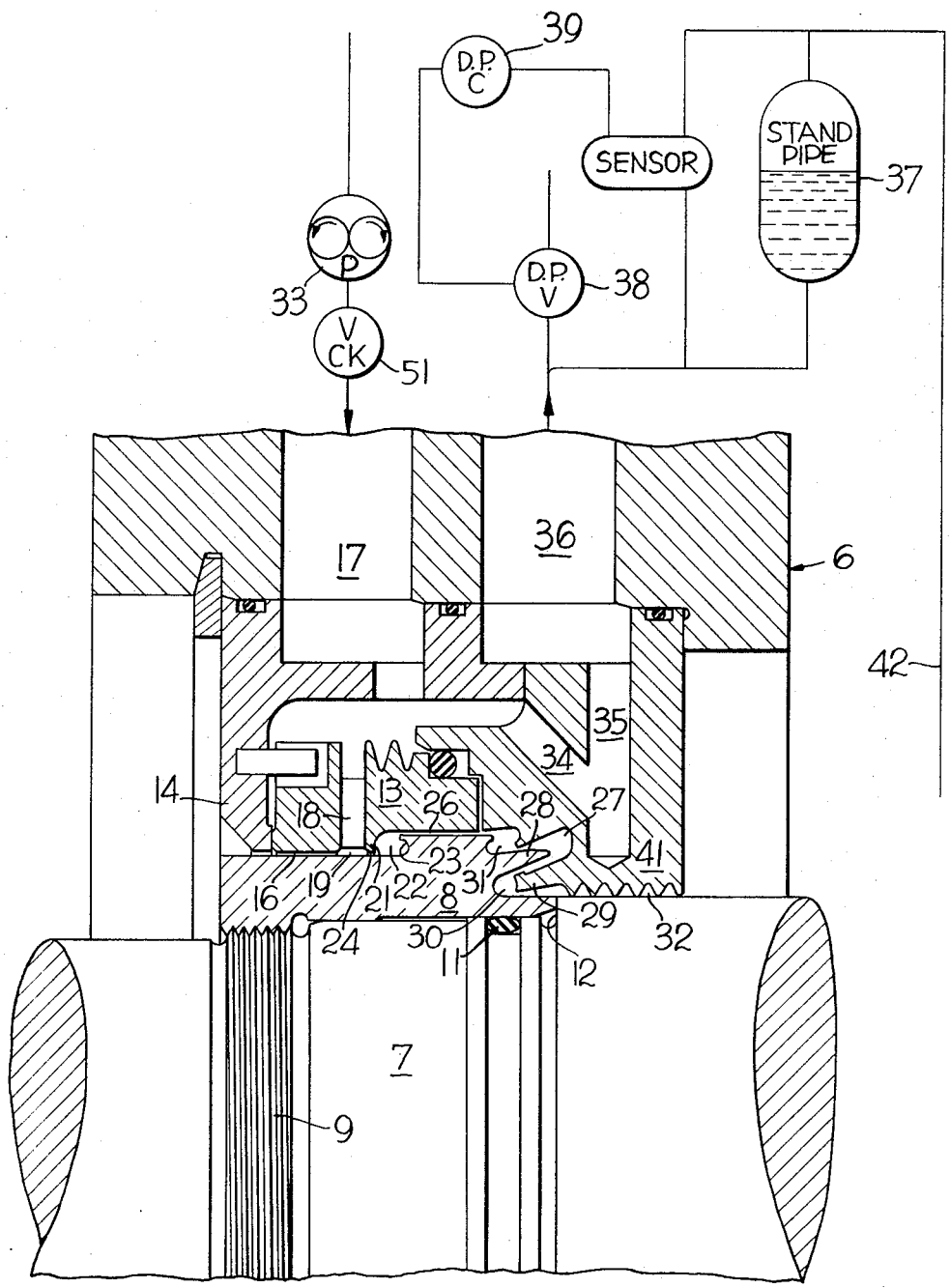
Inventor
Gerald Lesiecki
By John P Hines
Attorney

NEW TRAPPED BUSHING SEAL

CROSS REFERENCE TO RELATED PATENT APPLICATION

This invention pertains to a seal for fluid processing rotating machinery which is also the subject of my copending United States patent application entitled "Automatic Shutdown Seal," Ser. No. 84,297 filed concurrently with this application.

As the use of rotating machinery has expanded and the temperatures and pressures of the process fluids have increased, the ever present problem of providing a seal between a rotating shaft and a stationary housing has become more complex. A particularly difficult situation arises when it is required to seal a caustic or explosive gas. Since in this type of situation it is necessary to insure a complete sealing of the gas, liquid seals are quite frequently used. For ease of explanation, this description will refer to the process fluid as a gas and the sealing fluid as a liquid. However, it should be understood that the invention disclosed may be used in other applications so long as the sealing fluid has a greater density than the process fluid.

There are three basic types of seals which will be referred to in this description. A mechanical seal as herein used refers to a seal wherein there is actual physical contact between the rotating and stationary portions of the seal. A liquid film seal as used herein refers to a seal wherein a pair of bushings or a dual bushing is buffered with a sealing liquid at a positive pressure above the process gas. A pumping type liquid film seal as used herein refers to a seal wherein a liquid film type seal mentioned above is backed up with a pumping device which inhibits the flow of sealing liquid towards the process gas during operation.

Each of these three different types of seals has inherent drawbacks. The obvious drawback of the mechanical seal is due to the physical contact between the rotating and stationary portions of the seal which results in wearing of these portions and ultimate failure; the possibility of catastrophic failure always exists. However, it does have the inherent quality of being a positive seal during static conditions without a sealing fluid.

The liquid film seal, although not subject to the wearing drawbacks of the mechanical seal, is only effective while the sealing fluid is provided. The liquid film seal has a high loss of sealing fluid toward the process gas unless the clearances between the shaft and bushing are kept very small, less than 1 mil clearance per inch of shaft diameter, and/or the sealing fluid pressure over the process gas is low. Therefore, the liquid film seal is vulnerable to sudden temperature change which often results in failure and/or entrainment of the process gas into the sealing liquid in the clearance area which results in small quantities of the gas escaping to atmosphere. This entrainment and its causes will be explained more fully later in the description.

In the pumping type liquid film seal, the sealing liquid is always maintained at a substantial pressure above the process gas pressure to prevent entrainment of process gas in the sealing liquid so complete sealing of the process gas can be assured with a low loss of sealing fluid towards the process gas at operating speed comparable to that of the mechanical seal. Such a seal is disclosed in U.S. Pat. No. 3,127,181, issued Mar. 31, 1964, and assigned to the same assignee as this invention. While that seal has proven quite satisfactory, there is a considerable loss of sealing liquid while the machine is shutdown and prior to the time the machine reaches a certain percent of operating speed.

It is the general object of this invention to provide a pumping type liquid film seal wherein the loss of sealing liquid during shutdown and while the machine is operating at less than normal speed is kept at a minimum.

A further object of the subject invention is to provide a limited leakage shaft seal wherein the sealing liquid is provided at a pressure only slightly higher than the process gas and means are provided within the seal to increase this pressure sufficiently to overcome entrainment of the process gas into the sealing liquid.

An additional object of the subject invention is to provide a seal of the hereinbefore described type with a refined sealing fluid pressure balancing means while the machine is operating above 50 percent of normal operation speed to substantially inhibit leakage of the sealing liquid toward the process gas.

These and other objects of the subject invention will become more fully apparent as the following description is read in light of the attached drawing which shows a cross sectional view of a seal constructed in accordance with the invention.

Referring to the drawing a machine casing generally designated 6 has an opening therethrough in which is received a rotatable shaft 7. In this description, the left-hand end of the machine casing would be exposed to atmosphere and the right-hand end of the machine casing would be connected to the rest of the rotating machine containing pressurized gas to be sealed. A sleeve element or impeller 8 is rigidly connected to the shaft 7 in any conventional manner for rotation therewith. As herein shown for purposes of illustration, the shaft is provided with a threaded portion 9 onto which the impeller 8 is threaded. A conventional O-ring 11 may be provided between the shaft and the impeller 8 to insure a seal therebetween. A locating shoulder 12 may be provided on the shaft to insure proper axial location of the impeller 8.

A stepped dual bushing 13 is positioned about the impeller 8 in radial clearance therewith of the magnitude commonly used in journal bearings. This stepped bushing may be constructed as a separate element as shown herein so that it will float with the shaft 7 and impeller 8. One end portion of the stepped bushing 13 is in intimate contact with an end wall 14 of the outer seal housing to provide secondary sealing of the sealing liquid from the atmosphere. The impeller 8 and stepped bushing 13 define annular restricted fluid passages 16 and 26 which are open to the atmosphere and pressurized gas, respectively.

A sealing liquid inlet passage 17 is provided in the machine casing 6. The inlet passage 17 is in liquid communication with a passageway 18 through the stepped bushing 13. The passageway 18 communicates with an annular inlet chamber 19 located about the impeller 8 and defined by walls of the stepped bushing 13. The inlet chamber 19 is in liquid communication with one end of the restricted fluid passage 16.

An annular ridge 21 on an interior surface of the stepped bushing 13 forms one wall of the inlet chamber 19 and also one wall of a pumping chamber 22. This pumping chamber 22 is defined by the ridge 21 and the stepped bushing 13 and a shoulder 23 on the impeller 8. The interior annular edge of the ridge 21 defines an annular restricted port 24 connecting the inlet chamber 19 with the pumping chamber 22. Since this port 24 has a much smaller axial surface than the restricted fluid passages 16 or 26, it offers less resistance to liquid flow than the restricted fluid passage.

Annular restricted fluid passage 26 also serves as a transfer fluid passage. This transfer passage is at a greater radius than the port 24 and the restricted fluid passage 16 due to the shoulder 23 provided on the impeller 8. The transfer fluid passage is in fluid communication with the pumping chamber 22 and with a radial passage generally designated 27. The transfer passage restricts the leakage of sealing liquid toward the process gas during static conditions or part speed operation. The radial passage 27 is defined by one end of the impeller 8 and a nonrotational portion of the seal housing or stator 41.

The radial passage 27 is composed of one or more radially spaced substantially axially disposed fingers 28 on the impeller 8. Complementary radially spaced annular substantially axially disposed fingers 29 are provided on the nonrotational stator 41. These interleaved fingers 28 and 29 define an annular swirl chamber 30. It should be understood that although one annular swirl chamber 30 is herein shown, two or more such chambers may be required on certain applications.

The radially outer end of the radial passage 27 is in fluid communication with the annular transfer passage 26 through a chamber 31. The radially inner end of the radial passage 27 is in fluid communication with what is shown herein as a labyrinth-type passageway 32. This labyrinth-type passageway is defined by the shaft 7 and the stator 41. The opposite end of the labyrinth-type passageway 32 is in fluid communication with the process gas side of the seal.

A pump 33 is provided to supply the pressurized sealing liquid through a check valve 51 to the inlet passage 17. Cooling passages generally designated 34 and 35 connect the inlet passage 17 with a discharge passage 36. This discharge passage 36 is in communication with a stand pipe 37 and also with the system sump (not shown) through the differential pressure control valve 38. The stand pipe 37 is in fluid communication with the process fluid by means of conduit 42. Means may be provided in the form of a differential pressure control (or level control) 39 to insure sufficient liquid level in the stand pipe.

It is now necessary to analyze how this new seal operates to understand how it distinguishes over the prior art. If the gas is to be sealed from the atmosphere, the pressure of the sealing liquid entering the chamber 19 must be at a greater pressure than the gas pressure. If the sealing liquid pressure is too high, an excessive amount of the liquid will flow toward the process gas where it may become contaminated, and an expensive separation procedure may be necessary to remove the gas from the sealing liquid or the liquid may have to be discarded. Therefore, attempts have been made to maintain the liquid pressure only slightly higher than the gas pressure so an excessive amount of the sealing liquid does not become contaminated by the gas. However, it has been found that if too small a pressure differential is maintained, gas becomes entrained in the sealing liquid during operation and will find its way to atmosphere. This entrainment is due to differential pressure patterns that are set up in the area of the transfer passage 26. These differential pressure patterns are caused by conventional journal bearing action between the impeller 8 and stepped bushing 13. As the impeller 8 rotates, it squeezes the sealing liquid against the bushing 13 causing high and low pressure areas which vary in intensity depending on the eccentricity between and the relative roundness of the impeller 8 and stepped bushing 13. These pressure areas may rotate or assume some relatively fixed position in the transfer passage 26. If the liquid pressure in these low pressure areas is below the gas pressure, the gas will enter the low pressure areas and find its way to atmosphere. In order to insure that the gas does not enter the low pressure areas, the sealing liquid pressure has to be sufficiently high so that the pressure of the liquid in the low pressure areas is greater than the pressure of the gas.

With this larger pressure differential, we again have the problem of an excessive amount of sealing liquid flowing towards the gas. This problem was overcome in the previously mentioned U.S. Pat. No. 3,127,181 with a similar configuration of radial passage 27 to insure efficient back pressure pumping. In that patent, spoilers were provided to insure inefficient forward pressure pumping so that the net pumping was backward to just balance the pressure in the inlet chamber 19 and keep the liquid-gas interface within radial chambers 30. With such an arrangement as disclosed in the prior mentioned patent, complete sealing of the gas is assured at all times utilizing a high differential pressure on the order of 10 psi. Furthermore, since the effective pressure differential across the transfer passage 26 is zero, only a minimal amount of sealing liquid will flow into the process gas while the machine is operating.

However, with this high pressure differential, the amount of sealing liquid flowing toward the gas during low speed and static operation is in some applications intolerable. In the seal of this invention the pressure of the sealing liquid during low speed and static operation has been substantially reduced. It has been established empirically that in order to maintain sufficient sealing liquid pressure in the low pressure areas caused by the previously described journal bearing action, the sealing liquid must be maintained at a pressure which is at a nominal 10 psi higher than the gas pressure at peripheral speeds in the normal operating range of the machine. The sealing liquid pressure entering the radial passage 17 of this new trapped bushing seal is a nominal 2 psi higher than the gas pressure. The sealing liquid flows to pumping chamber 22 where due to the centrifugal effect of the shoulder 23, its pressure is raised to approximately 10 pounds higher than the gas pressure during normal operation. Because of the effect of centrifugal force in the pumping chamber, the mean pressure in the transfer passage 26 is also 10 pounds higher than the gas pressure, and this pressure forces the liquid to move down into chambers 31 and 30. Since the journal bearing action occurs in the transfer passage 26, no entrainment of the gas into the liquid results because of this 10 psi pressure differential of the sealing liquid above the process gas.

The pumping action due to centrifugal force of the rotating liquid in chamber 31 creates the back pressure to counteract the forward pressure of chamber 22. Sufficient chambers 30, usually one, are provided so that the pumping action due to centrifugal force of the rotating liquid in chamber 22 creates adequate back pressure to balance the remaining forward pressure from chamber 22, if any, and the pressure above process gas of the sealing liquid in chamber 19. This insures that an interface of gas and liquid exists in chamber 30. Therefore, little or no liquid seeps towards the gas during normal operation because the effective differential pressure towards the gas in transfer passage 26 equals zero. Furthermore, since the pressure of the sealing liquid in the transfer passage 26 is at a sufficient mean pressure differential above the gas, as for instance 10 psi, the lowest pressure due to the journal bearing action at either end of this passage will always be greater than the gas pressure; therefore, entrainment of the gas into the sealing liquid will not occur.

However, contrary to the seal disclosed in the above identified patent, the pressure of the sealing liquid at the entrance to transfer passage 26 of this seal decreases as the machine slows down. When the machine is completely stopped, the sealing liquid pressure is only on the order of 2 psi above the gas pressure as compared to the 10 psi in the previous seal. It can thus be seen that with this seal only one-fifth of that quantity of sealing liquid used in the previous seal will flow toward the process gas during low speed and static operation.

The embodiments of the invention in which an exclusive property or privilege is claimed are defined as follows:

1. In combination with a housing surrounding a rotating shaft, sealing means for sealing a high pressure fluid area from a low pressure fluid area comprising: a sealing fluid inlet passage in said housing; a sealing fluid source in communication with said passage supplying pressurized fluid thereto at a pressure only just sufficient to block the flow of said high pressure fluid when said shaft is not rotating; walls defining a restricted fluid passage having one end in fluid communication with said low pressure area and the other end in fluid communication with said inlet passage; a pumping chamber defined by a rotational wall and an adjacent stationary wall; means connecting said pumping chamber to said inlet passage; a radial fluid passage defined by a rotational wall and a stationary wall in fluid communication with said high pressure area, said rotational wall exerting a backward pressure on said sealing fluid in opposition to the pressure created in said pumping chamber; and a transfer passage defined by a rotating surface and a stationary surface connecting said pumping chamber in fluid communication with said radial passage at a point spaced radially outwardly from said radial passage connection to said high pressure area, the fluid in said transfer passage being exposed to high and low pressure gradients due to journal bearing action, said pumping chamber being constructed and arranged to raise said sealing fluid pressure so that the lowest journal bearing type pressure in said transfer passage extremity is above the pressure of said high pressure fluid area.

2. The combination set forth in claim 1 wherein the backward pressure created in said radial passage is equal to the pressure created in said pumping chamber plus the pressure of said sealing fluid.

3. The combination set forth in claim 1 wherein said transfer passage is in fluid communication with both said pumping chamber and said radial passage during all stages of operation and shutdown of said sealing means.

4. The combination set forth in claim 1 wherein said transfer passage is a restricted fluid passage disposed substantially parallel to the axis of said shaft and radially spaced therefrom a distance substantially equal to the spacing of the radially outer ends of said pumping chamber and radial passage from said shaft.

* * * * *